United States Patent Office 3,221,240
Patented Nov. 30, 1965

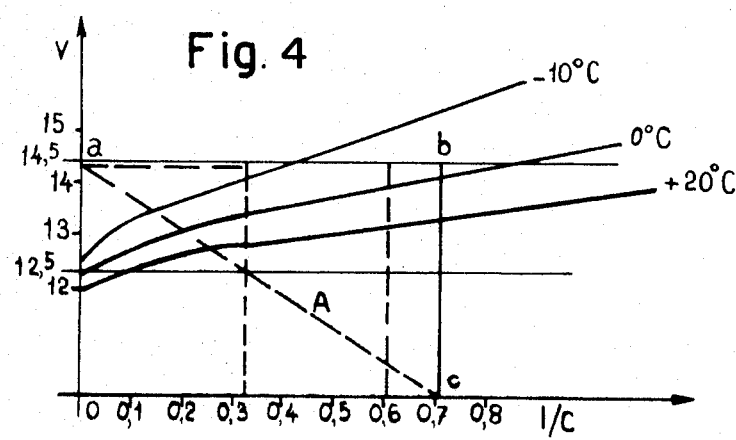

3,221,240
REGULATING CIRCUIT FOR DIRECT CURRENT
Friedrich Menzel, 2 Kollerstrasse, Stuttgart, Germany
Filed June 19, 1961, Ser. No. 117,917
Claims priority, application Italy, Apr. 15, 1961, 7,261/61
1 Claim. (Cl. 320—61)

This invention relates to voltage regulators for generators, more particularly dynamos, equipping electric installations on motor vehicles.

It is known that two manners of regulation are at present employed in connection with electric circuits on motor vehicles, namely a "flexible voltage regulation" and a power regulation or "toggle regulation."

In flexible voltage regulation the voltage of the generator, mostly a dynamo, sinks linearly on variations in current output. This adjustment suffers from a number of drawbacks, more particularly excessively variable brightness of the headlights and insufficient charge of the battery, particularly during the cold months.

In power adjustment, as is well known, a regulator is required which includes three magnetic cores for the cut-out relay, voltage regulating relay, and current regulating relay, respectively. In this case also brightness of the lamps oscillates according to the state of the battery charge, and charge of the battery at low temperatures is insufficient and not quick enough.

This invention provides a regulator which obviates the above mentioned drawbacks and largely meets the requirements of electric plants.

To this end the invention provides a regulator comprising a magnetic core for a cut-out relay and a magnetic core for the voltage regulating relay, the essential characteristic feature of which resides in the fact that it moreover includes a thermal switch acting on control means for the power delivered by the generator with which the regulator is associated, which is responsive to the heat from the generator, so as to cause the power output to vary in accordance with the heating of the generator.

With the improved device the voltage is always kept constant even when the generator is overloaded, up to the point at which the generator reaches its highest admissible temperature, when the thermal switch switches down the voltage to a value such as to prevent any damage occurring to the generator. After a predetermined cooling period the voltage is switched up again to its normal value.

In this manner the brightness of the headlights is kept at a substantially constant value, the battery being charged in a particularly quick and efficient manner.

Moreover, since the improved device does not include a current regulator, all the well known drawbacks connected with the contacts of such regulator are avoided.

Figure 1A:
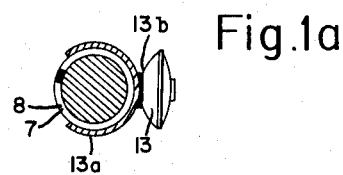
Figure 1:
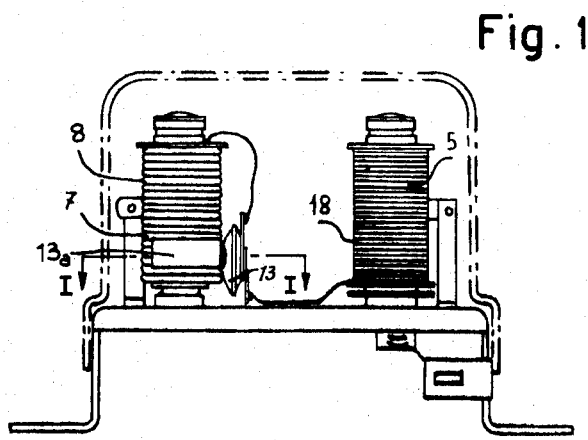
Figure 2:
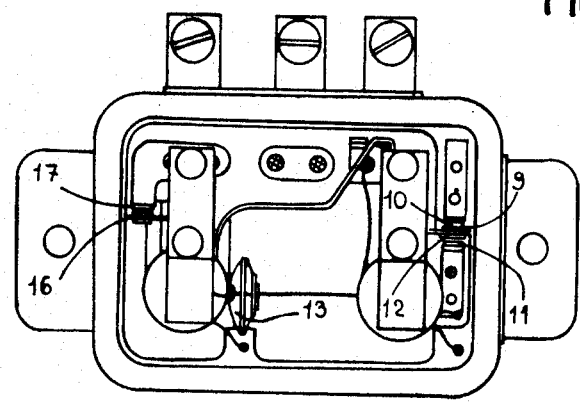
Figure 3:
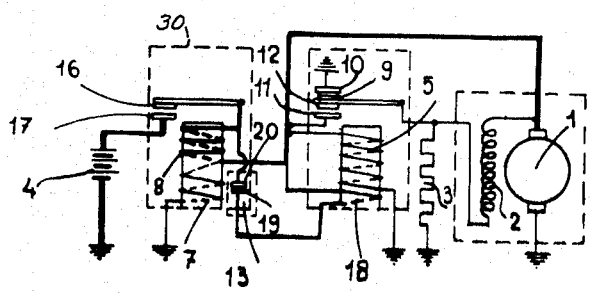

Further characteristic features and advantages of this invention will be understood from the appended detailed description referring to the accompanying drawings given by way of a non limiting example, wherein:

FIG. 1 is a middle elevational sectional view of the regulator according to the invention, FIG. 1a is a sectional view on line I—I of FIG. 1, FIG. 2 is a plan view of FIG. 1, FIG. 3 is a wiring diagram of the regulator, FIG. 4 is an explanatory diagram showing the adjustment afforded by the regulator according to this invention.

Referring to FIGURES 1, 2 and 3, a direct current generator 1, having an excitation winding 2, is connected to a battery 4 by a regulating circuit comprising a known voltage regulating relay and a known cut-out relay 30. The voltage regulating relay comprises a voltage coil 5 wound on a core for controlling vibrating contacts 9–12. In operation, when the voltage supplied to the excitation winding 2 rises, the coil 5 opens the normally closed contacts 9, 10, to connect a resistor 3 in series with the excitation winding 2, and reduce the excitation current, until the contacts 9, 10 close again. Thus, the alternative opening and closing of contacts 9, 10 maintains the voltage across the brushes of the generator 1 at a constant value such as 14.5 volts. When, due to either a sudden fall in electric load, or a sudden increase in number of revolutions of the generator 1, the voltage supplied to the excitation winding 2 increases in spite of the action of contacts 9, 10, the current supplied to the coil 5 also increases, so that following the aperture of the contacts 9, 10, the contacts 11, 12 close to short-circuit the excitation coil 2, whereby the excitation of the generator ceases and the contacts 11, 12 open to connect the resistor 3 in series with the excitation winding 2. The contacts 11, 12 open and close further to maintain the voltage across the generator brushes at 14.5 volts for the duration of the above mentioned sudden causes, and when the latter ceases, the contacts 9, 10 undertake the regulating function.

The cut-out relay 30 comprises a magnetic core having wound thereon a voltage coil 7 and a current coil 8 and a pair of vibrating contacts 16, 17. The coils 7, 8 have one common terminal electrically connected to the positive brush of the generator 1, while the other terminal of the coil 7 is grounded and the other terminal of the coil 8 is connected to the contact 16, so that when the contacts 16, 17 are closed, said other terminal of the coil 8 is grounded through the battery 4.

The coil 7 is wound in an opposite direction to the coil 8, so that with a current flowing from the generator 1 the coils are in parallel and the magnetic force of the coil 7 assists the force of the coil 8, but with a current flowing from the battery 4, the coils 7, 8 are in a series and the magnetic force of the coil 7 opposes the force of the coil 8.

When the generator 1 is inoperative, the contacts 16, 17 are open, but when the generator operates, the coil 7 is energized by the voltage across its brushes and tends to close the contacts 16, 17, which occurs, due to the setting of the cut out relay 30 when the voltage across the brushes exceeds the voltage of the battery 4, for instance 12.5 volts. With the contacts 16, 17 closed, the current from the generator also flows through the coil 8, further compressing the contacts 16, 17 and charging the battery.

Under these circumstances a fall in voltage across brushes below 12.5 volts causes the battery 4 to discharge through coils 8 and 7 connected in series. Therefore, the magnetic force of the coil 7 opposes the force of the coil 8 and the contacts 16, 17 open, preventing discharge of the battery.

According to this invention, there is provided, between the terminal of the coil 8 connected to the contact 16 and the positive brush of the generator 1, a circuit branch comprising a thermal switch 13 having normally open contacts 19, 20 connected in series to a current coil 18, wound on the same core and in the same direction as the coil 5. When the contacts 19, 20 are closed, the coil 18 is connected in parallel to the coil 8. As shown in FIGS. 1, 1a and 2, the thermal switch 13 is fixed closely adjacent the coil 8, in a good heat transfer relationship with said coil, the temperature of which is proportional to that of the generator 1. With the contacts 19, 20 open, the current from the generator energizes the coil 5 of the voltage regulating relay to maintain the voltage across the brushes at 14.5 volts in the above described manner, but when, due to the rise in temperature of the current coil 8, the contacts 19, 20 of the thermal switch 13 close, the generator energizes the coil 18 also, the magnetic force of which assists the coil 5 in operating the contacts 9-12, whereby the voltage regulating relay lowers the voltage across the brushes to a lower value, such as 12.5 volts as illustrated in FIGURE 4 by the dotted line A.C. However, when, as previously described, the voltage across the brushes falls to 12.5 volts, the contacts 16, 17 of the cut-out relay open to interrupt the current and the generator runs idle, whereby both the generator and coil 8 cool down, until the thermal switch 13 opens and cuts out the coil 18, so that the action of the voltage regulating relay is due to coil 5 only, which brings the voltage across the brushes back to 14.5 volts.

Since the temperature of the coil 8 is proportional to the temperature of the generator, the thermal switch 13 is set to close at a temperature of the coil 8 corresponding to the maximum permissible temperature of the generator.

This small thermal switch is in a particularly advantageous manner of the enclosed metal type distributed under the name of "Paratherm" by Kontaktwerk Enzberg, which widely warrants an always constant predetermined switching on and off temperature.

The thermal switch 13 should be mechanically attached with particular care. The casing of the switch 13 should be mechanically secured to the current coil 8 of the cut-out relay in a stable manner so as to withstand the vehicle vibrations and at the same time constantly maintain from a thermal standpoint a thorough steady contact with the current coil, in order to keep the switching on and off timing constant.

In order to meet the above requirements a particularly simple and suitable attachment is proposed. FIG. 1a shows the current coil 8 and attachment of the thermal switch 13. The casing of the latter is welded to a resilient slit ring 13a at 13b, where the ring has a hole bored therethrough. The ring is made of a copper alloy having satisfactory resilient and heat conducting properties. The ring is snapped onto the core with the interposition of a thin insulator foil for avoiding short circuits on the periphery of the coil 8. This affords a highly stable mechanical attachment without an air gap between the ring 13a and coil 8, as well as a thorough contact and constant heat conduction between the coil 8 and thermal switch 13. Timing of switching is therefore kept constant.

The regulator according to this invention affords a solution which largely takes care, more efficiently than known regulators, of actual requirements of the electric plant on motor vehicles, and affords the following extremely important advantages:

(a) Charging of the battery is more efficient and quicker, overload of the dynamo being avoided, so that the dynamo is more efficiently utilized under a thermal standpoint;

(b) The voltage applied to the headlights is kept substantially stable at its constant normal value, as distinct from regulators of known type, so that the lamps are more efficiently utilized and lighting by night is improved;

(c) Suppression of the current regulator with vibrating contacts avoids drawbacks due to sticking of the contacts which easily occur notwithstanding the use of silver, wolfram, molybdenum, palladium and similar alloys.

While the embodiment of the present invention as herein disclosed constitutes a preferred form, it is to be understood that other forms might be adopted.

What I claim is:

In a regulating circuit connecting a direct current generator to a battery, a voltage regulating relay comprising a core and a voltage coil wound on said core, a current coil on said core wound in the same direction as said voltage coil, a cut-out relay comprising a core, a current coil wound on said core and a pair of vibrating contacts, the last mentioned current coil having one terminal connected to a generator brush, a second terminal of said last mentioned current coil being connected to one of said contacts, the other contact being connected to the battery, said regulating circuit comprising a circuit branch having two terminals and comprising a normally open thermal switch disposed in a heat transfer relationship with said current coil on said cut-out relay and connected in series to said current coil wound on the core of the voltage regulating relay, one terminal of said circuit branch being connected to said generator brush, the other terminal being connected to said second terminal of the current coil of the cut-out relay, and fixing means for said thermal switch closely adjacent to and in a good heat transfer relationship with said current coil of the cut-out relay, said fixing means comprising a resilient slit ring of a material having good heat conducting properties firmly fixed to said casing.

References Cited by the Examiner
UNITED STATES PATENTS

| | | | |
|---|---|---|---|
| 2,777,980 | 1/1957 | Menzel | 320—35 X |
| 2,906,939 | 9/1959 | Rice | 322—34 X |

LLOYD McCOLLUM, *Primary Examiner.*